Figure 1:
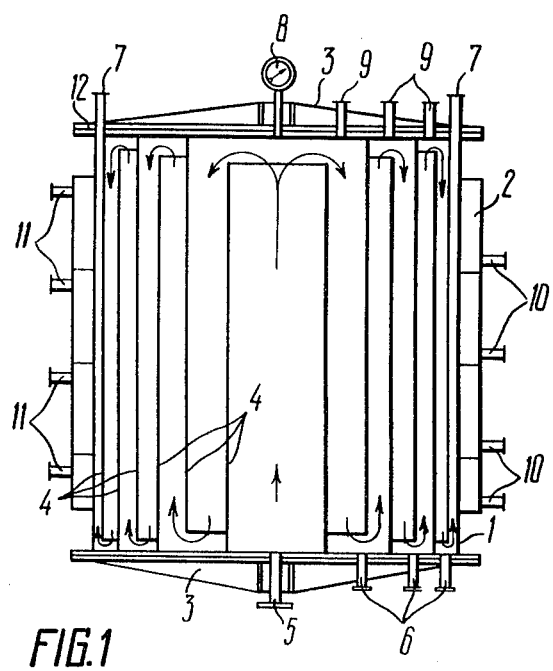

United States Patent [19]
Merzhanian et al.

[11] 3,916,775
[45] Nov. 4, 1975

[54] APPARATUS FOR WINE CHAMPAGNIZATION IN A CONTINUOUS STREAM

[76] Inventors: Artemy Arutjunovich Merzhanian, ulitsa Novokuznechnaya, 10, kv. 4, Krasnodar; Sergei Alexeevich Brusilovsky, 5, Nopeichikovskyperevlok, 13, kv. 63, Moscow; Naskid Grigorievich Sarishvili, ulitsa Ceroey Panfilovisev, 1, korpus 4, kv. 52, Moscow; Zbignev Nikolaevich Kishkovsky, ulitsa Begovaya, 22, korpus 3, kv. 207, Moscow; Issal Iosifovich Bronshtein, 1, Dmistrovsky proezd. 4, kv. 1, Moscow; Mikhail Alexeevich Gagarin, Broisojuznaya ulitsa, 33, kv. 144, Moscow, all of U.S.S.R.

[22] Filed: June 20, 1974

[21] Appl. No.: 481,474

Related U.S. Application Data

[62] Division of Ser. No. 320,927, Jan. 4, 1973.

[30] Foreign Application Priority Data
Jan. 4, 1972  U.S.S.R............................ 1737547

[52] U.S. Cl. .................................................. 99/277
[51] Int. Cl. ............................................ C12g 1/00
[58] Field of Search .......... 99/276, 275, 277, 277.1, 99/277.2, 278; 198/127; 426/15

[56] References Cited
UNITED STATES PATENTS

| 196,373 | 10/1877 | Montstorm | 99/277.2 |
| 210,863 | 12/1878 | Lansburgh | 99/277 X |
| 2,010,974 | 8/1935 | Andrieu | 99/276 X |
| 2,536,994 | 1/1951 | Cremaschi | 99/276 X |
| 3,374,726 | 3/1968 | Takayangi | 99/275 |
| 3,628,445 | 12/1971 | Weber | 99/277.1 |

*Primary Examiner*—Robert L. Bleutge
*Assistant Examiner*—Arthur O. Henderson

[57] ABSTRACT

The champagne wine stock is subjected to secondary fermentation in a continuous stream at a stable mean linear velocity of the stream of the wine stock being fermented in an apparatus comprising a single cylindrical vessel with concentric cylindrical partitions mounted on the vessel ends so that the secondary fermentation process involves reversing the direction of the stream of the material being fermented, and gradual lowering of the temperature of said material is effected by cooling said material in the terminal stream portion only, followed by the recuperative cooling of the stream bulk.

1 Claim, 2 Drawing Figures

U.S. Patent  Nov. 4, 1975  3,916,775

APPARATUS FOR WINE CHAMPAGNIZATION IN A CONTINUOUS STREAM

This is a divisional of application Ser. No. 320,927, filed Jan. 4, 1973.

The invention relates to food technology involving fermentation processes and, more particularly, it relates to processes and apparatus for wine champagnization in a continuous stream.

A method is known for wine champagnization in a continuous stream, which comprises subjecting the fermentable stock, on first fermentation completion, to the secondary fermentation in a stream wherein the temperature is gradually raised and the pressure is maintained constant.

Said known method is embodied by using an apparatus comprising a plurality of hermetic cylindrical vessels which are series connected and furnished with a jacket for fermentation temperature control, said vessels being interconnected by pipelines fitted with relevant controlling and shut-off means.

Practical experience gained in the course of employing said prior art apparatus for carrying into effect said known method of wine champagnization showed the preferred amount of cylindrical hermetic vessels per apparatus to be from six to seven.

However, the known method of wine champagnization fails to provide for the constancy of mean linear velocity of the fermentable stock stream that flows through a plurality of vessels and connecting pipelines, whereby the quality of the target product is affected adversely.

It will also be noted that the known equipment has excessive floor space requirements and presents difficulties in servicing.

It is an object of the present invention to provide a method of wine champagnization in a continuous stream and an apparatus for accomplishing same, which make it possible to improve the end product quality characteristics and to increase the end product output per output floor space.

This object is accomplished by shaping the fermentable stock, on primary fermentation completion into a stream and subjecting the resulting fermentable stock stream to a secondary fermentation at a gradually decreasing temperature and under a constant pressure, wherein, according to the invention, the process is conducted in a single vessel and the direction of fermentable stock stream flow is reversed at least once, gradual temperature lowering being attained by cooling the fermentable stock in the terminal stream portion only, followed by the recuperative cooling of the entire stream.

To the attainment of said object, the present invention is embodied in an apparatus comprising a hermetic cylindrical vessel furnished with a jacket which forms, in combination with the vessel surface, a cavity for refrigerant supply thereinto, wherein, according to the invention, in the vessel there is disposed at least one cylindrical partition mounted on one end of the vessel bottom in concentric relationship to the vessel side wall so as to obtain between the other end of said partition and the other end of the vessel bottom an annular gap for fermentable stock flow from the chamber formed by said cylindrical partition into the annular chamber formed by said partition and the vessel side wall, the stability of the mean linear velocity of the fermentable stock stream being attained by making the free area of the gap in the cylindrical partition and the free area of the annular chamber formed by said partition and the vessel side wall equal to one another and to the annular gap height multiplied by the length of the cylindrical partition circumference.

The present invention provide the possibility of improving the end product quality viz., of enchancing specific champagne properties (sparkling and effervescence) and organoleptic characteristics (flavour, color, taste, etc.) of the end product.

The apparatus, according to the present invention, is advantageous in that it increases the end product output per unit floor space and simultaneously provides for the improved quality of the end product.

The apparatus is further advantageous in that it dispenses with connecting pipelines and diverse controlling and shut-off means; servicing the apparatus involves no difficulties.

Figure 2:
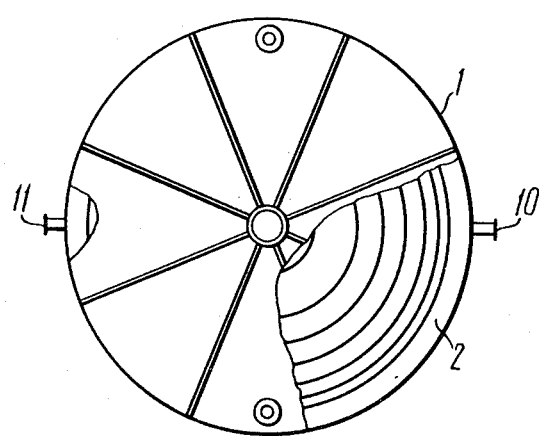

Other objects and advantages of the present invention will be apparent from the following detailed description of the present apparatus for accomplishing same, and the accompanying drawings, wherein:

FIG. 1 is a sectional view of the continuous stream apparatus for wine champagnization, according to the invention; and FIG. 2 is the apparatus of FIG. 1 in the partial cutaway plan view.

Wine champagnization, according to the present invention, is effected by subjecting a fermentable stock consisting of pre-processed champagne wine stock (cuvee), a solution of crystalline sucrose in the wind stock (tirage liqueur) and yeast, to the secondary fermentation under constant pressure in a continuous stream, the stream direction being periodically reversed while maintaining the mean linear velocity of the stream constant.

We have found that carrying out the process of secondary fermentation at a constant mean linear velocity of the material being champagnized provides for the uniform distribution of yeast cells throughout the bulk of said material, thereby enchancing both specific and general organoleptic characteristics if the end product.

It will be noted that the secondary fermentation is conducted while gradually lowering the temperature, said temperature lowering being attained, according to the present invention, by cooling said material in the terminal stream portion only, followed by the recuperative cooling of the entire stream.

The recuperative mode of stream cooling makes for a very smooth variation of the temperature of the material being champagnized, so that the fermentative functions of yeast cells will not be inhibited.

The wine champagnization in a continuous stream is conducted in an apparatus comprising a hermetic cylindrical vessel 1 furnished with a jacket 2, which forms, in combination with the side wall of the vessel, a cavity for refrigerant flow, and end members 3 (flat or spherical). Disposed inside the vessel 1 in concentric arrangement are cylindrical partitions 4 whose number and diameter are governed by the contemplated throughput capacity of the apparatus for wine champagnization. The number of partitions may be as small as one, but the optimum number of partitions equals six to seven.

The cylindrical partitions 4 are disposed in the vessel 1 so that some of said partitions are rigidly mounted along the entire periphery of one butt end thereof to one end member 3 of the vessel 1 and there obtains an annular gap between the other butt end of each said partition and the opposite end member 3 of the vessel 1. Other partitions 4 are affixed in a similar manner to said opposite end member 3 and form similar annular gaps with the former end member 3.

Where use is made of one cylindrical partition only, the free area of the annular gap and that of the annular chamber formed by said partition and the vessel side wall are equal to each other, the free area being the product of the annular gap height by the cylindrical partition circumference length.

The equality of said flow area is observed also in case the vessel houses a plurality of partitions, said equality being instrumental in providing for the secondary fermentation under the conditions of the stability of the mean linear velocity of the champagne stock stream.

We have found that the aforesaid arrangement of the cylindrical partitions in the vessel makes for dispersing uniformly, in the bulk of the champagne stock being fermented, the yeast cells that settle on the walls of said partitions, whereby the quality characteristics of the end product are improved and the secondary fermentation process is intensified.

In the central part of the vessel end member 3, provision is made for a champagne stock and yeast inlet opening 5, said vessel end member 3 being also furnished with openings 6 for discharging the sediment from and cleaning of the vessel, as well as for sampling the material being fermented.

The opposite vessel end member 3 is furnished with end product outlet openings 7. To avoid unsteady mean linear velocities of the material being fermented in the apparatus the number of outlet openings 7 may vary, depending on the apparatus throughput capacity, from four to six. In said opposite end member 3, provision is also made for an aperture 8 that accommodates a pressure gauge and for sampling holes 9, which likewise serve for gas cushion venting during the start-up period.

The jacket 2 of the apparatus may be disposed both on the vessel end member 3 and on the cylindrical side wall of the vessel.

However, the jacket 2 should preferably be mounted on the cylindrical side wall of the vessel 1 in order to cool in a more uniform manner the terminal portion of the fermenting material stream.

Provision in made in the jacket 2 for refrigerant inlet ports 10 and refrigerant exit ports 11.

The apparatus for wine champagnization, according to the present invention, functions as follows.

The mixture to be fermented consisting of the champagne stock (cuvee), a solution of crystalline sucrose in the champagne stock (tirage liqueur), and yeast, is fed into the vessel via the inlet opening 5. The proportions of the aforementioned components are selected so as to obtain in the present apparatus the product of the Brut Champagne type (sugar content, 0.2–0.3 percent maximum).

Said mixture undergoes secondary fermentation (champagnization) while flowing continuously along a zigzag path as indicated by the arrows in FIG. 1 through the central cylindrical chamber and the annular chambers. During fermentation, the material being processed becomes saturated with the carbon dioxide evolved as a result of fermentation and acquires specific properties of champagne.

The champagnization is effected in the present apparatus under an excess carbon dioxide gas pressure which should be greater than the pressure in equilibrium with the carbon dioxide concentration in the end product leaving the apparatus through the outlet opening 7, said excess pressure being pertinent for avoiding the formation of gas cushions in the vessel (dechampagnization).

The concentration of carbon dioxide in the end product is governed, in its turn, by the amount of fermented sugar and by the end product temperature.

The secondary fermentation process is conducted under constant pressure and at a gradually decreasing temperature. The temperature of the fermentable mixture is stabilized in the 5° and 15°C range by feeding the refrigerant into the jacket 2, the desired temperatures being thereafter maintained by the recuperative cooling technique.

The end product leaving the apparatus via the outlet opening 7 is next processed in accordance with the continuous method of champagne manufacture.

We claim:

1. An apparatus for continuous-stream wine champagnization, comprising a hermetically sealed cylindrical vessel; a jacket, which forms, in combination with the surface of said vessel, a cavity for refrigerating supply thereinto; a cylindrical partition mounted concentrically with one butt end thereof on a vessel bottom so as to obtain between the other butt end of said partition and the other bottom of said vessel an annular gap for the flow of the material being fermented from the chamber formed by said partition into an annular chamber formed by said partition and the vessel side wall wherein, in order to provide for the stability of the mean linear velocity of the stream of the material being fermented, the free area of the gap in the cylindrical partition and the free area of the annular chamber formed by said partition and the vessel side wall being equal to one another and to the annular gap height multiplied by the length of the cylindrical partition circumference.

* * * * *